US007651675B2

(12) United States Patent
Matsumoto et al.

(10) Patent No.: US 7,651,675 B2
(45) Date of Patent: Jan. 26, 2010

(54) PROCESS FOR PRODUCING FLAKY TITANIUM OXIDE CAPABLE OF ABSORBING VISIBLE LIGHT

(75) Inventors: Taki Matsumoto, Ibaraki (JP); Nobuo Iyi, Ibaraki (JP); Yoshiro Kaneko, Ibaraki (JP); Kenji Kitamura, Ibaraki (JP)

(73) Assignee: National Institute for Materials Science, Tsukuba-shi (JP)

( * ) Notice: Subject to any disclaimer, the term of this patent is extended or adjusted under 35 U.S.C. 154(b) by 316 days.

(21) Appl. No.: 11/662,504

(22) PCT Filed: Sep. 13, 2005

(86) PCT No.: PCT/JP2005/016835

§ 371 (c)(1),
(2), (4) Date: Mar. 12, 2007

(87) PCT Pub. No.: WO2006/030780

PCT Pub. Date: Mar. 23, 2006

(65) Prior Publication Data

US 2008/0003153 A1 Jan. 3, 2008

(30) Foreign Application Priority Data

Sep. 13, 2004 (JP) ............................. 2004-265318

(51) Int. Cl.
*C01G 23/047* (2006.01)
*C01G 25/00* (2006.01)
(52) U.S. Cl. ........................................ 423/610; 423/81
(58) Field of Classification Search ....................... None
See application file for complete search history.

(56) References Cited

U.S. PATENT DOCUMENTS

2006/0009351 A1* 1/2006 Iwamoto et al. ............. 502/200
2006/0210798 A1* 9/2006 Burda ........................ 428/402

FOREIGN PATENT DOCUMENTS

JP 2002-255554 A 9/2002

(Continued)

OTHER PUBLICATIONS

D. Matsumoto "Synthesis of layered organically modified titanium oxides prepared by hydrophobic Sol-Gel process"; 92th CATSJ Meeting Abstract, vol. 45, No. 6, 2003, pp. 457-459. Cited in the international search report.

(Continued)

*Primary Examiner*—Melvin C Mayes
*Assistant Examiner*—Sheng Han
(74) *Attorney, Agent, or Firm*—Westerman, Hattori, Daniels & Adrian, LLP

(57) ABSTRACT

When titanium oxide is doped with nitrogen, the resulting titanium oxide photocatalyst can be driven with visible light, which is a main component of sunlight. However, in a known process, since a high-temperature heat treatment process necessary for nitrogen doping degrades the photocatalytic activity inherent in titanium oxide, it is difficult to produce a titanium oxide photocatalyst that can be driven with a high efficiency under sunlight.

A titania/organic substance composite, which includes an organic ligand coordinated to flaky titania and forms a layered structure, is immersed in aqueous ammonia to substitute the organic ligand between layers with a hydroxyl group by a ligand exchange reaction, and at the same time, to introduce ammonium into between layers of the titania having the layered structure. The resulting composite of titania and ammonium is heated at a temperature of 400° C. or higher and in such a temperature range that does not cause rutile transition, whereby nitrogen is doped into the titania by thermal decomposition of the ammonium and, in addition, titania is crystallized to an anatase form.

4 Claims, 4 Drawing Sheets

FOREIGN PATENT DOCUMENTS

| | | | |
|---|---|---|---|
| JP | 2002-361097 A | | 12/2002 |
| JP | 2003-190809 A | | 7/2003 |
| JP | 2003-340288 A | | 12/2003 |
| JP | 2004-097868 A | | 4/2004 |
| WO | WO 0110552 | * | 2/2001 |

OTHER PUBLICATIONS

D. Matsumoto et al.; "Preparation of a Transparent and Flexible Self-Standing Film of Layered Titana/Isostearate Nancomposite by Hydrophobic Sol-Gel Process", The Ceramic Society of Japan, Mar. 2004, p. 41. Cited in the international search report.

Brian O'Regan et al.; "A low-cost, high-efficiency solar cell based on dye-sensitized colloidal $TiO_2$ films", Letters to Nature, vol. 353, Oct. 24, 1991, pp. 737-739.

R. Asahi et al.; "Visible-Light Photocatalysis in Nitrogen-Doped Titanium Oxides", Science, vol. 293, Jul. 13, 2001, pp. 269-271.

K. Kato et al.; "Crystal structures of $TiO_2$ thin coatings prepared from the alkoxide solution via the dip-coating technique affecting the photocatalytic decomposition of aqueous acetic acid"; Journal of materials Science, vol. 29, 1994, pp. 5911-5915.

International Search Report of PCT/JP2005/016835, date of mailing: Dec. 20, 2005.

Translation of International Preliminary Report on Patentability mailed May 31, 2007 of International Application No. PCT/JP2005/016835.

Iwamoto, S. et al., "Photocatalytic Property of the Silica-Modified Titania Treated with NH3", The 71st Meeting Abstracts, Mar. 24-26, 2004, p. 103, The Electrochemical Society of Japan.

Ozaki, H. et al., "Photocatalytic Activity of the Silica-Modified Titania Microcrystals Treated with NH3", The 93rd Catalyst Panel Discussion Proceedings of A Group, Mar. 30-31, 2004, p. 129, Catalysis Society of Japan and The Chemical Society of Japan.

* cited by examiner

PROCESS FOR PRODUCING FLAKY TITANIUM OXIDE CAPABLE OF ABSORBING VISIBLE LIGHT

TECHNICAL FIELD

The present invention relates to a process of producing flaky titanium oxide for a photocatalyst capable of absorbing visible light.

BACKGROUND ART

Photocatalysts are substances that cause charge separation in their molecules by light irradiation and donate generated electrons or holes, or both electrons and holes to another substance, thereby oxidizing or reducing the other substance. That is, photocatalysts are substances that induce various types of oxidation-reduction reaction by light.

Recently, photocatalysts have attracted attention as a material used for environmental clean-up, antifouling, defogging, sterilization, hydrogen production by water splitting, or light-electric energy conversion devices, a known example of which is a Graetzel cell (Non-Patent Document 1). Titanium oxide is most widely used as such a photocatalyst because of its high photocatalytic activity and low production cost.

The reason that titanium oxide causes charge separation by light irradiation is that it has characteristics of an optical semiconductor. The band gap of titanium oxide is about 3.2 eV. Accordingly, normal titanium oxide is excited only by irradiation of light in the ultraviolet region having a wavelength of 380 nm or less, which corresponds to the band gap energy of titanium oxide, and can be driven as a photocatalyst.

Considering the practical application of photocatalysts, sunlight is exclusively used for the driving thereof. However, light in the ultraviolet region, which can be utilized by a known titanium oxide photocatalyst, accounts for only 3% to 5% of the sunlight spectrum provided on the ground, and thus, the driving of the photocatalyst with a high efficiency is limited.

Accordingly, if the wavelength of light that can be used by a titanium oxide photocatalyst can be shifted to a longer wavelength side, visible light, which is a main component of sunlight, can be used. In such a case, it is expected that the photocatalyst can be driven under sunlight with a high efficiency.

Recently, nitrogen-doped titanium oxide has been reported as a titanium oxide photocatalyst capable of being driven with visible light (Non-Patent Document 2 and Patent Documents 1 to 6). By substituting some of the oxygen atoms of titanium oxide with nitrogen atoms, the band gap of titanium oxide becomes narrow. Consequently, the titanium oxide is excited by not only ultraviolet light but also light in the visible range having longer wavelengths and causes charge separation to exhibit a photocatalytic activity.

The nitrogen-doped titanium oxide that has been reported to date is produced by heating normal titanium oxide in a nitrogen stream or an ammonia stream at a high temperature in the range of 500° C. to 800° C. for several hours. Such high-temperature and high-nitrogen concentration conditions are essential to introduce nitrogen into titanium oxide in an amount sufficient to change the band gap.

However, such a heat treatment process at a high temperature generally degrades the photocatalytic activity. Since a photocatalytic reaction is conducted on the surface of the catalyst, a high specific surface area is required in order to exhibit a high activity. However, such a long-term heat treatment process at a high temperature causes densification of the photocatalyst, thereby markedly drastically decreasing the specific surface area.

The photocatalytic activity of titanium oxide largely depends on the crystallinity thereof, and in general, it is believed that metastable anatase-type titanium oxide has the highest activity (Non-Patent Document 3). However, when the anatase-type titanium oxide undergoes a heat treatment process at a high temperature, it transforms to rutile-type titanium oxide, which is the most stable crystal form of titanium oxide.

Patent Document 1: PCT Publication No. WO01/010552
Patent Document 2: Japanese Unexamined Patent Application Publication No. 2002-255554
Patent Document 3: Japanese Unexamined Patent Application Publication No. 2002-361097
Patent Document 4: Japanese Unexamined Patent Application Publication No. 2003-190809
Patent Document 5: Japanese Unexamined Patent Application Publication No. 2003-340288
Patent Document 6: Japanese Unexamined Patent Application Publication No. 2004-97868
Non-Patent Document 1: B. O'Regan and M. Graetzel, Nature 353 (24) 737 (1991)
Non-Patent Document 2: R. Asahi, T. Morikawa, T. Ohwaki, K. Aoki, and Y Taga, Science 2001, Vol. 293, P. 269
Non-Patent Document 3: K. Kato, A. Tsuzuki, H. Taoda, Y. Torii, T. Kato, and Y Butsugani, J. Mater. Sci. 29 (1994) 5911

DISCLOSURE OF INVENTION

Problems to be Solved by the Invention

As described above, by doping nitrogen into titanium oxide, a titanium oxide photocatalyst, which can be hitherto driven with only ultraviolet light, can also be driven with visible light, which is a main component of sunlight. However, by the known processes, the high-temperature heat treatment process necessary for nitrogen doping degrades the photocatalytic activity inherent in titanium oxide. Therefore, it is difficult to produce a titanium oxide photocatalyst that can be driven with a high efficiency under sunlight.

If nitrogen can be doped into titanium oxide having a high specific surface area in an amount sufficient to exhibit light absorption in the visible light region under mild conditions that do not cause densification or rutile transition, it is expected that a titanium oxide photocatalyst that can be driven with an extremely high efficiency under sunlight can be obtained. However, such a process has not yet been developed.

Means for Solving the Problems

The present invention provides a highly practical and extremely simple chemical synthesis process of doping nitrogen into titanium oxide in an amount sufficient to exhibit visible-light excitation due to a change in the band gap by a simple and mild chemical process without inducing phenomena that degrade the photocatalytic activity of a titanium oxide photocatalyst, such as densification, destruction of structure, and rutile transition due to a heat treatment process at a high temperature.

The present invention provides a process of producing flaky titanium oxide for a photocatalyst capable of absorbing visible light. The process includes synthesizing a layered titania/organic substance composite having an organic ligand that is exchangeable for a hydroxyl group between the layers or a titania/organic substance composite having a similar structure by a sol-gel method using a hydrophobic solvent, and treating the resulting composite with aqueous ammonia.

According to the process of the present invention, nitrogen can be doped into titanium oxide in an amount sufficient to exhibit a catalytic activity in the visible light region, a structure having a high specific surface area can be imparted to the titanium oxide, and the state of the crystallization of the titanium oxide can be freely controlled. Accordingly, the process of the present invention can provide a photocatalyst that can be driven with an extremely high efficiency under sunlight. Furthermore, since the process of the present invention includes simple procedures under mild conditions, the applicability of this process is marked from the standpoints of industrial productivity and cost.

A feature of the process of the present invention lies in that a titania/organic substance composite prepared by a sol-gel method in which a titanium alkoxide is reacted in a liquid is used as a precursor of the titanium oxide photocatalyst. In this process, morphologies such as the size, the shape, and the structure of the titania can be designed at the stage of the precursor. That is, the process of the present invention is characterized in that the process of titania preparation and the process of nitrogen doping are completely independent. Morphologies preferred for a photocatalyst, such as a minute size and a high specific surface area, are achieved in the process of titania preparation, and the visible-light driving characteristics due to nitrogen doping can be further imparted to titanium oxide while the preferred morphologies are maintained. Therefore, according to the process of the present invention, it is expected that a visible light-responsive photocatalyst having significantly higher performance and higher efficiency than those of known titanium oxide photocatalysts can be obtained.

In the present invention, a titania/organic substance composite composed of titania and an organic ligand is synthesized by a sol-gel method in which a titanium alkoxide is reacted in a liquid phase, and the resulting composite is used as a precursor. A nitrogen-doped titanium oxide photocatalyst that can be driven with visible light is produced by a step of immersing the above composite in aqueous ammonia to substitute the organic ligand with a hydroxyl group by a ligand exchange reaction, and at the same time, to introduce high-concentration ammonium in the aqueous ammonia into between layers of the titania having a layered structure; a step of drying then resulting substance; and step of heating the dry substance in a specific temperature range.

Various substances can be used as the titania/organic substance composite serving as the precursor as long as an organic ligand exchangeable for a hydroxyl group is coordinated to titania. In particular, the composite is preferably synthesized by a "sol-gel method" in which a titanium alkoxide is reacted in a solution because it is expected that an organic substance can be incorporated in the composite at the molecular level. Examples of the titanium alkoxide include any titanium alkoxides such as titanium ethoxide, titanium methoxide, titanium isopropoxide, and titanium n-butoxide. Various organic solvents can be used for the reaction. After the immersion in aqueous ammonia, since the organic ligand is lost and substituted with a hydroxyl group, the resulting product is moved from the organic solvent phase to the aqueous phase. Accordingly, from the standpoints of control of high reactivity of titanium alkoxides and ease of the separation of the product, a hydrophobic solvent having low miscibility with water is preferably used.

To prepare the titania/organic substance composite, an organic substance that constitutes the composite is mixed in a solution of a titanium alkoxide, and a reaction is then conducted. The organic substance to be mixed must coordinate to titania to produce the titania/organic substance composite, and in addition, must be exchangeable for a hydroxyl group in the subsequent treatment with aqueous ammonia.

Examples of such a substance include various carboxylic acids. When a carboxylic acid and a titanium alkoxide are mixed, a carboxylate (carboxylate ion) is coordinated to the titanium alkoxide. Subsequently, by adding moisture to the solution, hydrolysis and polycondensation reaction occur, thus obtaining a titania/carboxylate composite in which the carboxylate is coordinated to titania. The carboxylic acid is not limited to a specific carboxylic acid. A plurality of different types of carboxylic acid may be used in combinations.

FIG. 1(A) schematically shows the structure of a layered titania/carboxylate composite prepared as described above. The carboxylate is coordinated on the surfaces of flaky titania sheets, and the titania sheets are organized by a hydrophobic interaction between the carboxylates to form a layered structure. Such self-organization caused by an interaction of an organic substance is a phenomenon that can be found in the synthesis of various inorganic/organic substance composites other than the process described above.

In this process, flaky titania is prepared by two-dimensional growth of a titanium alkoxide. Alternatively, chain-shaped (one-dimensionally grown) or spherical (three-dimensionally grown) titania can also be prepared by changing the reaction conditions (such as the amount of water added, the type of salt catalyst used, and the amount of organic ligand) to change the dimensions of the grown material. Furthermore, the size of titania to be produced can be controlled by deactivating a salt catalyst used for promoting polycondensation after a desired reaction time has passed.

By treating the resulting titania/carboxylate composite with aqueous ammonia, the coordinated carboxylate is substituted with a hydroxyl group, and at the same time, ammonium is introduced between layers of titania having a layered structure, as schematically shown in FIG. 1(B). From the standpoints that the carboxylate is completely removed and a sufficient amount of ammonium is introduced, concentrated aqueous ammonia at room temperature or higher but lower than 100° C. is preferably used as the aqueous ammonia. A temperature of 100° C. or higher is not preferable because ammonia is vaporized from the aqueous ammonia.

The substance obtained after the treatment with aqueous ammonia is dried and then heated, thereby doping nitrogen into titania by decomposition of ammonium and crystallizing to anatase. Thus, a nitrogen-doped flaky titanium oxide photocatalyst that can be driven with visible light can be obtained. When the heating temperature is excessively low, the crystallization to anatase does not satisfactorily proceed, and a sufficient amount of nitrogen is not introduced into titanium oxide. On the other hand, an excessively high heating temperature is also not preferable because densification and crystallization to rutile occur and the introduced nitrogen is released again. From the above standpoints, the heat treatment temperature is preferably at 400° C. or higher to about 500° C. or lower, which is a temperature range that does not cause rutile transition.

The solving means of the present invention is as described above, but will now be described more specifically using an example. Comparative Examples 1, 2, 3, and 4 are also described in order to describe advantages of the present invention.

EXAMPLE 1

Titanium tetraisopropoxide (12.5 mmol) and isostearic acid (6.25 mmol) were mixed under a nitrogen atmosphere, and the mixture was diluted with o-xylene so that the total volume reached 15 mL. On the other hand, isostearic acid (1.25 mmol) and n-hexylamine (1.25 mmol) were mixed, and the mixture was diluted with o-xylene so that the total volume reached 10 mL to prepare a solution of a salt catalyst for promoting polycondensation. Both solutions were mixed, and the mixture was then opened to the air and stirred. Reaction was conducted by gradually allowing moisture in the air to be absorbed while the temperature was maintained at 25° C. Thus, a sol containing a titania/isostearate composite was prepared.

The shape of the product in the resulting sol was observed with a scanning electron microscope. The result showed the formation of a layered structure in which very thin titania sheets were stacked (FIG. 2). The measurement result of an IR absorption spectrum showed that isostearate was coordinated to the titania sheets (FIG. 3a).

The sol containing the titania/isostearate composite was mixed with concentrated aqueous ammonia (28 weight percent), and the mixture was then stirred at 60° C. for two hours. After the stirring, the aqueous phase was extracted with a separatory funnel. Centrifugal separation of the product and washing with aqueous ammonia were repeated five times, and the resulting solid matter was dried at 120° C. According to the measurement result of an IR absorption spectrum, absorption peaks due to isostearate completely disappeared, and a peak due to a hydroxyl group appeared instead. Peaks due to ammonium were also observed (FIG. 3b). According to the measurement result of X-ray diffraction (XRD), crystallization was not observed, and the product was amorphous (FIG. 4a).

The prepared solid matter was dried at 120° C. as described above and then heated at 450° C. for two hours in air. The resulting substance was yellow and exhibited a strong absorption in the visible light region (400 to 500 nm), which is not observed in normal titanium oxide (FIG. 5b). In the measurement result of XRD, only peaks due to anatase-type titanium oxide were observed (FIG. 4c). The shape of the product was observed with a scanning electron microscope. According to the result, the flaky shape was maintained after the heat treatment (FIG. 6), and the width of the flake in the plane direction was about 10 μm. According to the measurement result of a nitrogen adsorption BET, the specific surface area of the product was 8 $m^2g^{-1}$.

Subsequently, 0.1 weight percent of the resulting titanium oxide was suspended in a 0.05 mM aqueous solution of methylene blue whose pH was adjusted to 3 with hydrochloric acid. The suspension was stirred for 12 hours while light was shielded. The suspension was fed in a quartz cell and was irradiated with visible light (470 nm) using 20 blue LEDs with a diameter of 5 mm while oxygen was bubbled. The photocatalytic activity under the irradiation of visible light was evaluated from the amount of decomposition of methylene blue. According to the result, a marked decomposition was observed, and the titanium oxide exhibited a high photocatalytic activity (FIG. 7b).

COMPARATIVE EXAMPLE 1

The heat treatment temperature in Example 1 was changed to 350° C. In this case, the specific surface area was 112 $m^2g^{-1}$, and a strong absorption in the visible light region was also observed (FIG. 5a). However, the degree of crystallinity of anatase was lower than that in Example 1 (FIG. 4b), and the photocatalytic activity under visible light was also lower than that in Example 1 (FIG. 7a).

COMPARATIVE EXAMPLE 2

The heat treatment temperature in Example 1 was changed to 550° C. In this case, the specific surface area was 7 $m^2g^{-1}$, which was almost the same as that in Example 1. However, the introduced nitrogen was released at this heat treatment temperature, and a strong absorption in the visible light region was not observed (FIG. 5c). The crystal form was anatase (FIG. 4d), but the photocatalytic activity under visible light was lower than that in Example 1 (FIG. 7c).

COMPARATIVE EXAMPLE 3

A commercially available anatase-type titanium oxide photocatalyst ST-01 (manufactured by Ishihara Sangyo Kaisha Ltd., specific surface area: 327 $m^2g^{-1}$) is a white powder that does not have an absorption in the visible light region (FIG. 5d). The photocatalytic activity of ST-01 under the irradiation of visible light was evaluated from the amount of decomposition of methylene blue as in Example 1. According to the result, the photocatalytic activity under visible light was extremely low (FIG. 7d).

COMPARATIVE EXAMPLE 4

The treatment with aqueous ammonia and the heat treatment were performed using ST-01 as in Example 1. However, a sufficient amount of nitrogen was not doped in ST-01 to which no carboxylate was coordinated. Consequently, a strong absorption in the visible light region, which was observed in Example 1, was not observed (FIG. 5e), and the photocatalytic activity under visible light was lower than that in Example 1 (FIG. 7e).

INDUSTRIAL APPLICABILITY

The nitrogen-doped titanium oxide obtained by the present invention exhibits a high photocatalytic activity under the irradiation of visible light and it is expected that the nitrogen-doped titanium oxide can be used as a photocatalyst capable of being driven with a high efficiency under sunlight. According to the production process of the present invention, a nitrogen-doped titanium oxide in which the size, the shape, the structure, and the state of crystallization are controlled can be simply produced.

Figure 1:
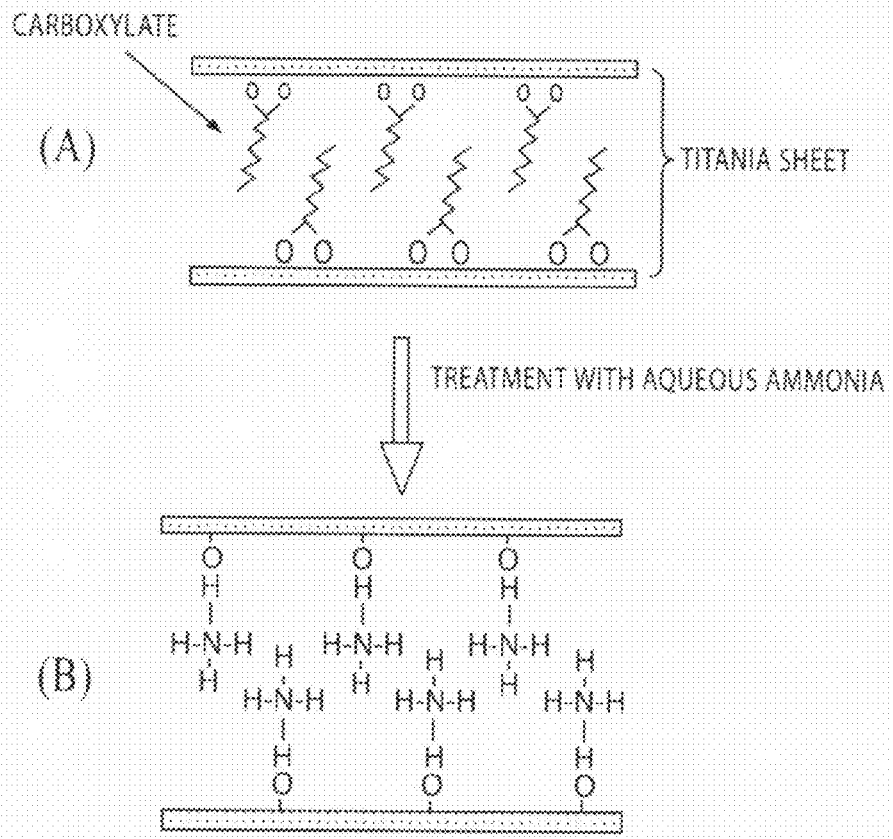
FIG. 1 includes schematic views showing a production process of the present invention in which a titania/organic substance composite is treated with aqueous ammonia to produce a composite of titania and ammonium.
Figure 2:
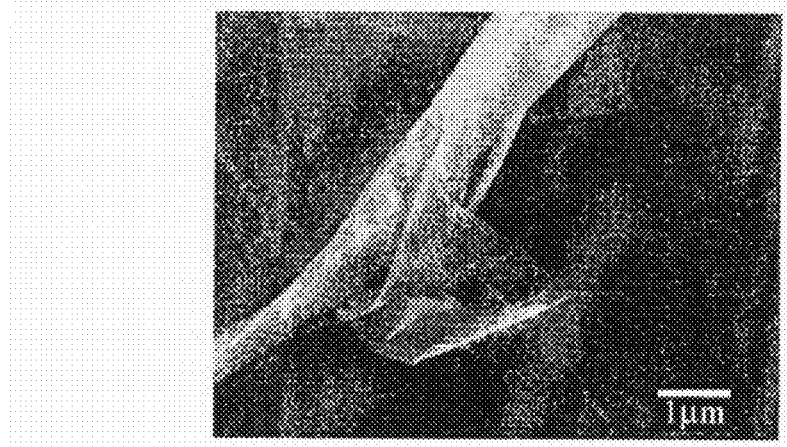
FIG. 2 is a photograph as a drawing obtained by observing a sol prepared in Example 1 with a scanning electron microscope.
Figure 3:
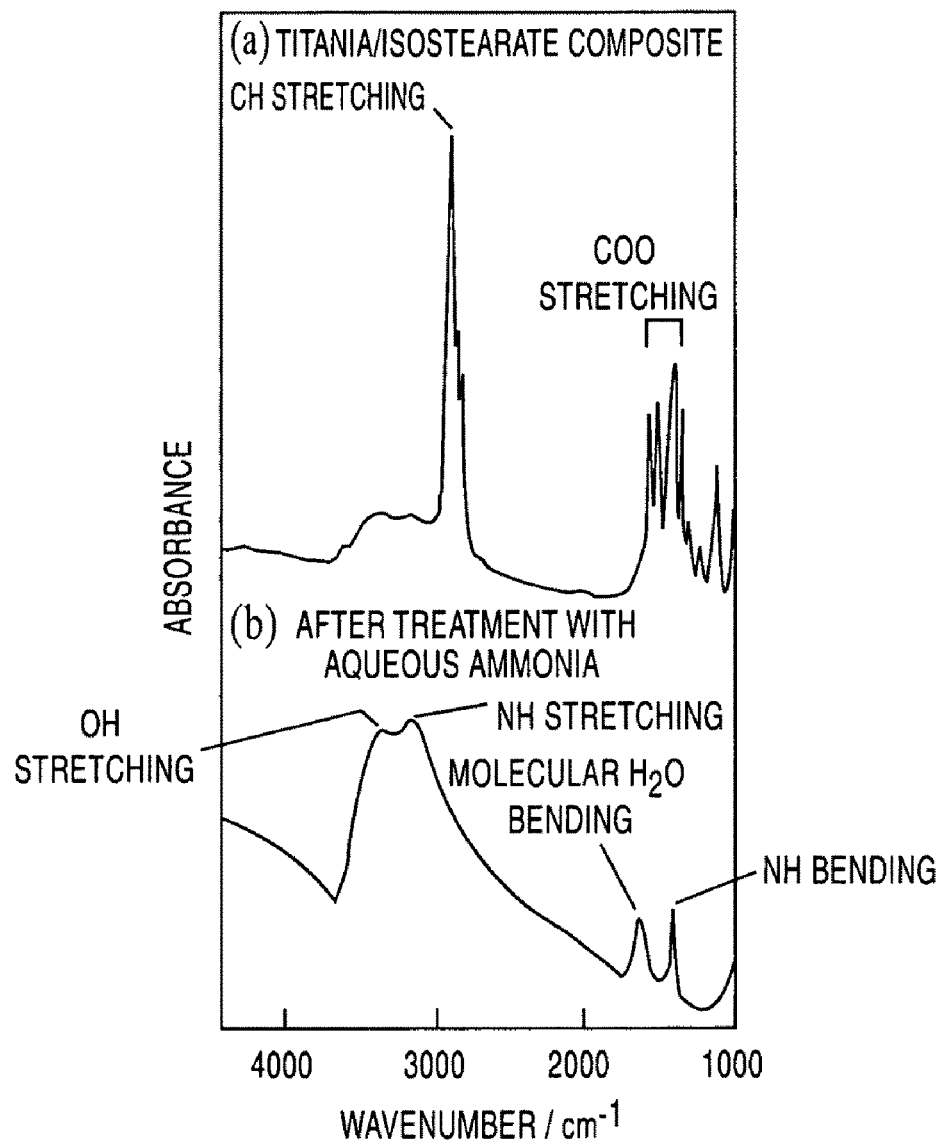
FIG. 3 includes an IR absorption spectrum (a) of the sol prepared in Example 1 and an IR absorption spectrum (b) thereof after a treatment of aqueous ammonia.
Figure 4:
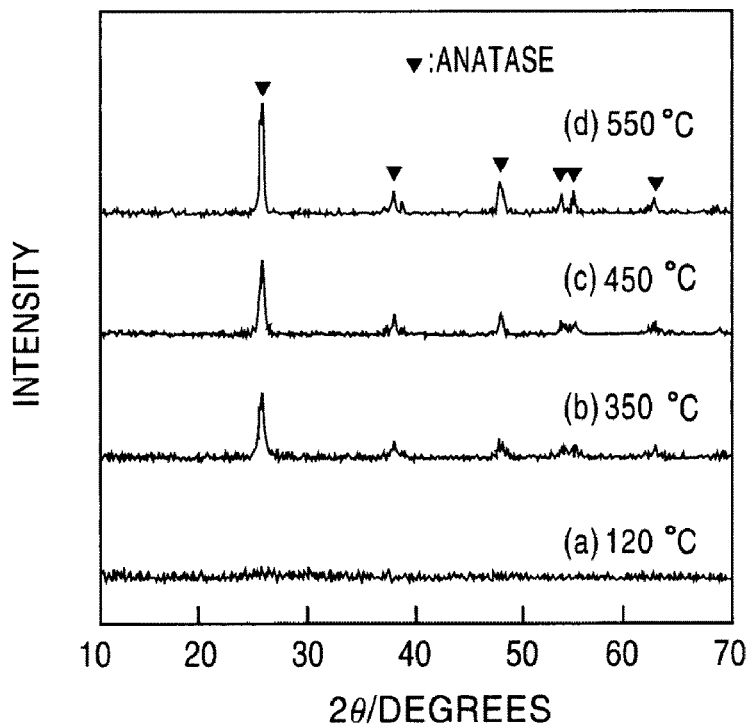
FIG. 4 includes X-ray diffraction (XRD) patterns of substances that underwent a treatment of aqueous ammonia followed by a heat treatment in Example 1 and Comparative Examples 1 and 2.
Figure 5:
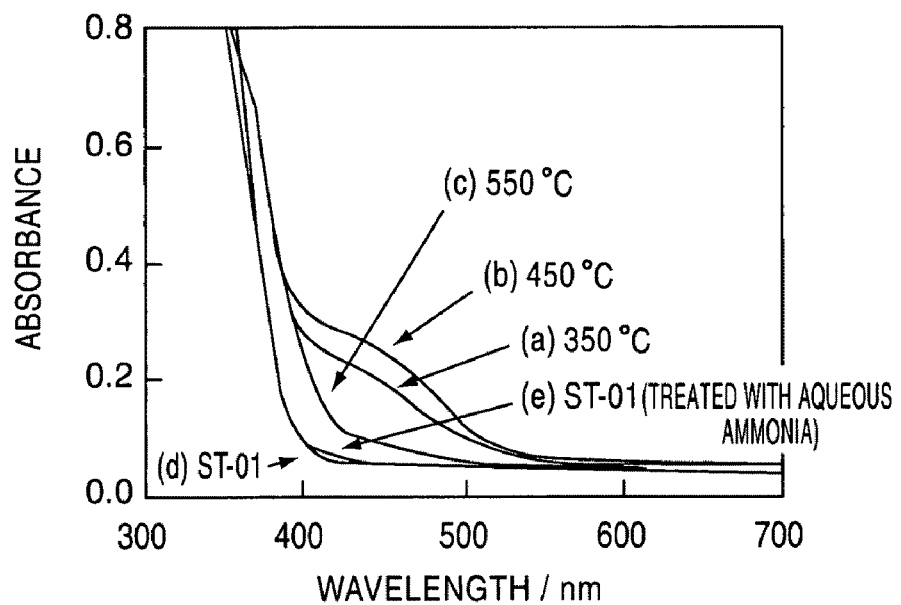
FIG. 5 is a graph showing the relationship between the wavelength and the absorbance of titanium oxide photocatalyst prepared in Example 1 and Comparative Examples 1 to 4.
Figure 6:
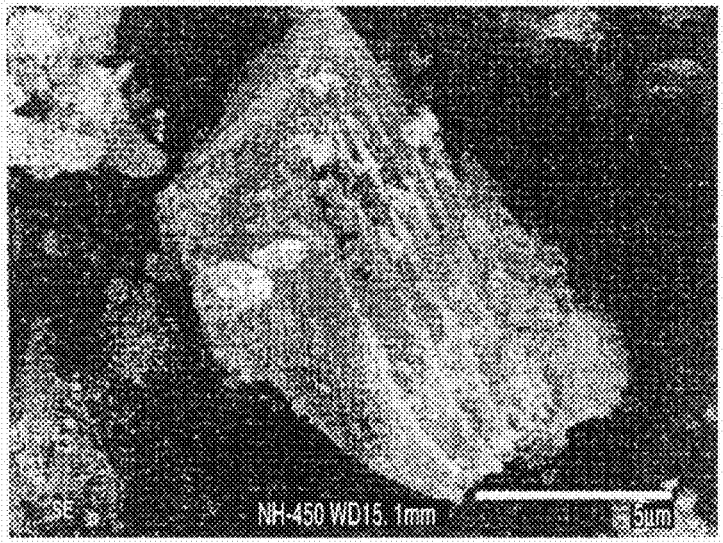
FIG. 6 is a photograph as a drawing obtained by observing the substance obtained after heating in Example 1 with a scanning electron microscope.
Figure 7:
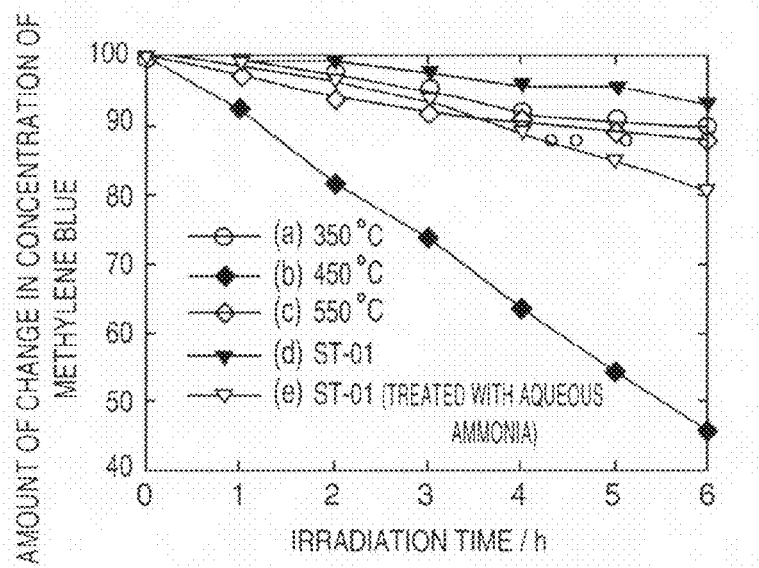
FIG. 7 is a graph showing evaluation results of the photocatalytic activity of titania photocatalysts prepared in Example 1 and Comparative Examples 1 to 4 under the irradiation of visible light.

The invention claimed is:

1. A process of producing a nitrogen-doped titanium oxide for a photocatalyst having light absorption in the visible light region, comprising the steps of:
    preparing a titania/organic substance composite including an organic ligand coordinated to flaky titania and forming a layered structure;
    immersing said titania/organic substance composite in aqueous ammonia, thereby substituting the organic ligand between layers with a hydroxyl group by a ligand exchange reaction, and at the same time, introducing ammonium in the aqueous ammonia into between layers of the titania having the layered structure;
    drying the resulting composite of titania and ammonium; and,
    after the drying step, heating the composite at a temperature in the range of 400° C. to 500° C., whereby nitrogen is doped into titania by thermal decomposition of the ammonium and, in addition, titania is crystallized to an anatase form.

2. The process of producing titanium oxide according to claim 1, wherein the titania/organic substance composite is prepared from a mixed solution of a titanium alkoxide and an organic substance by hydrolysis and polycondensation reaction of the titanium alkoxide.

3. The process of producing titanium oxide according to claim 2, wherein the organic substance is a carboxylic acid and the titania/organic substance composite is a composite having a layered structure composed of titania and a carboxylate.

4. The process of producing titanium oxide according to claim 1, wherein the temperature of the aqueous ammonia is room temperature or higher but lower than 100° C.

* * * * *